United States Patent
Xiao et al.

(10) Patent No.: US 8,106,605 B2
(45) Date of Patent: Jan. 31, 2012

(54) BACKLIGHT CONTROL CIRCUIT

(75) Inventors: Hua Xiao, Shenzhen (CN); Tong Zhou, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 722 days.

(21) Appl. No.: 12/228,398

(22) Filed: Aug. 11, 2008

(65) Prior Publication Data
US 2009/0039802 A1    Feb. 12, 2009

(30) Foreign Application Priority Data
Aug. 10, 2007   (CN) .................. 2007 1 0075663

(51) Int. Cl.
   *G05F 1/00*   (2006.01)
(52) U.S. Cl. ............... 315/307; 315/209 R; 315/291; 361/90

(58) Field of Classification Search ............ 315/291, 315/299, 301, 307, 209 R, 225; 361/90
See application file for complete search history.

(56) References Cited

U.S. PATENT DOCUMENTS

| | | | |
|---|---|---|---|
| 4,370,600 A | 1/1983 | Zansky | |
| 5,909,089 A * | 6/1999 | Deurloo et al. | 315/307 |
| 6,570,347 B2 | 5/2003 | Kastner | |
| 2006/0245220 A1* | 11/2006 | Fukumoto | 363/98 |
| 2006/0267922 A1* | 11/2006 | Kim | 345/102 |
| 2008/0068327 A1* | 3/2008 | Chien | 345/102 |

FOREIGN PATENT DOCUMENTS
CN    1873747 A    12/2006

* cited by examiner

*Primary Examiner* — Jacob Y Choi
*Assistant Examiner* — Anthony Arpin
(74) *Attorney, Agent, or Firm* — Altis Law Group, Inc.

(57) ABSTRACT

An exemplary backlight control circuit includes a pulse width modulation integrated circuit (PWM IC) having a power input terminal, a power source capable of outputting an operation voltage, and a switching circuit connected between the power source and the PWM IC to control if the operation voltage is provided to the power input terminal.

18 Claims, 2 Drawing Sheets

BACKLIGHT CONTROL CIRCUIT

FIELD OF THE INVENTION

The present invention relates to backlight control circuits, and particularly, to backlight control circuits including a switching circuit.

GENERAL BACKGROUND

Liquid crystal displays (LCDs) have been widely used in various portable information products such as notebooks, personal digital assistants (PDAs), and video cameras, because of its portability, low power consumption, and low radiation. LCDs are poised to completely replace cathode ray tube monitors and televisions. A typical LCD includes an LCD panel, a backlight for illuminating the LCD panel, and a backlight control circuit for controlling the backlight.

Referring to FIG. 4, a typical backlight control circuit 10 includes a pulse width modulation (PWM) integrated circuit (IC) 11, a power source 12, and a control terminal 13. The PWM IC 11 includes an enable terminal 112 connected to the control terminal 13 and a power input terminal 111 connected to the power source 12. The power source 12 provides an operational voltage, for example, 5 volts, to the PWM IC 11. The control terminal 13 receives a control signal from a scalar IC (not shown) of an LCD.

The backlight control circuit 10 is configured to turn a backlight (not shown) of the LCD on or off. If the LCD is turned off, the scalar IC generates a control signal having a low voltage and sends the control signal to the enable terminal 112 via the control terminal 13. The PWM IC 11 is not operational and no pulse signal is outputted. If the LCD is turned on, the scalar IC generates the control signal having a high voltage, for example, 3.3 volts, and sends the control signal to the enable terminal 112 via the control terminal 13. The PWM IC 11 is operational and output pulse signals are outputted to light up the backlight of the LCD.

In some abnormal conditions, such as load shorting or overload, the operational voltage of the power source 12 can be decreased, for example, lower than 5 volts. If a high operational voltage is still provided to the PWM IC 11, the pulse signals outputted from the PWM IC 11 is unsteady, resulting in an unsteady light emission of the backlight. Thus, a reliability of the backlight control circuit 10 is low.

It is desired to provide a new backlight control circuit, which can overcome the above-described deficiency.

SUMMARY

A backlight control circuit includes a PWM IC having a power input terminal, a power source capable of outputting an operation voltage, and a switching circuit connected between the power source and the PWM IC to control if the operation voltage is provided to the power input terminal.

Other novel features and advantages will become more apparent from the following detailed description when taken in conjunction with the accompanying drawings.

DETAILED DESCRIPTION OF THE EMBODIMENTS

Figure 1:
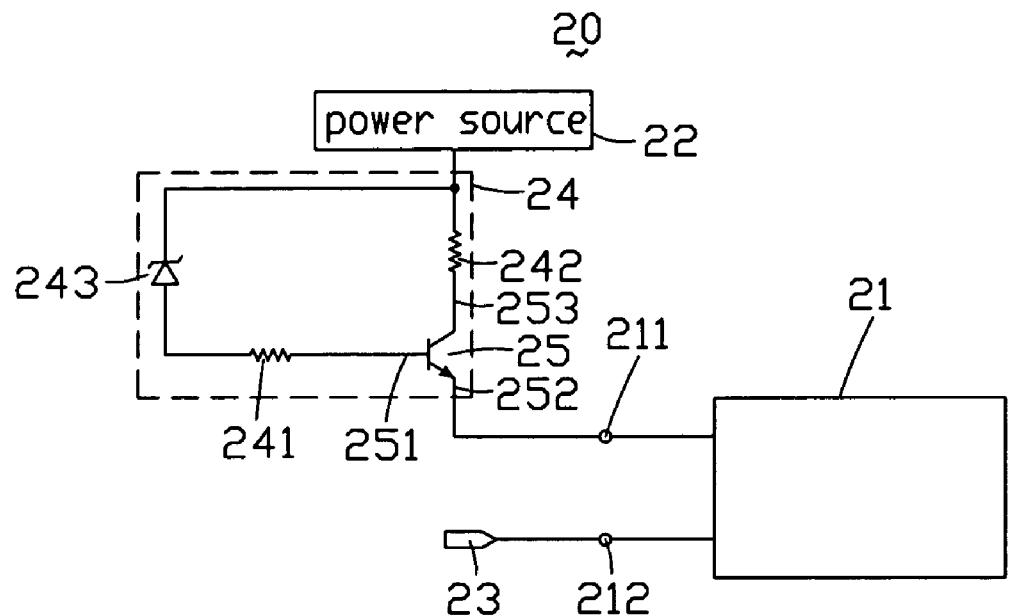
FIG. 1 is a diagram of a first embodiment of a backlight control circuit.

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Reference will now be made to the drawings to describe various embodiments in detail.

Referring to FIG. 1, a first embodiment of a backlight control circuit 20 includes a PWM IC 21, a power source 22, a control terminal 23, and a switching circuit 24 connected between the power source 22 and the PWM IC 21.

The PWM IC 21 includes an enable terminal 212 connected to the control terminal 23 and a power input terminal 211 connected to the power source 22 via the switching circuit 24. The power source 22 provides an operation voltage to the PWM IC 21 via the switching circuit 24. The control terminal 23 receives a control signal from a scalar IC (not shown) of an LCD (not shown).

The switching circuit 24 includes a transistor 25, a first resistor 241, a second resistor 242, and a first zener diode 243. The transistor 25 includes a base electrode 251 connected to the power source 22 via the first resistor 241 and the first zener diode 243 in a forward conduction direction in series, a collector electrode 253 connected to the power source 22 via the second resistor 242, and an emitter electrode 252 connected to the power input terminal 211.

For exemplary purposes only, an operation voltage provided by the power source 22 is 5 volts, a type of the PWM IC is OZ9910G, a resistance of the first resistor 241 is 1.0 kiloohm, and a resistance of the second resistor 242 is 3.3 kiloohm. A zener voltage of the first zener diode 243 is approximately equal to or larger than the operation voltage provided by the power source 22.

The backlight control circuit 20 is configured to turn on or turn off a backlight (not shown) of the LCD. If the LCD is turned off, the scalar IC generates the control signal having a low voltage, for example, zero volts, and sends the control signal to the enable terminal 212 via the control terminal 23. The PWM IC 21 is not operational and no pulse signal are outputted to light up a backlight of the LCD.

If the LCD is turned on, the scalar IC 21 generates the control signal having a high voltage, for example, 3.3 volts, and sends the control signal to the enable terminal 212 via the control terminal 23. If the operation voltage is provided to the power input terminal 211 via the switching circuit 24, the PWM IC 21 is operational and output pulse signals to light up the backlight.

If the operation voltage becomes less than the zener voltage, the first zener diode 243 cannot be reversely conducted. The operation voltage cannot be provided to the base electrode 251 and the transistor 25 is turned off. The PWM IC 21 will not be operational and no pulse signal is outputted.

If the operation voltage becomes larger than or equal to the zener voltage, the first zener diode 243 is reversely conducted. The operation voltage is provided to the base electrode 251 via the reversely conducted first zener diode 243 and the second resistor 241, thereby turning on the transistor 25. The operation voltage is provided to the power input terminal 211 via the first resistor 241 and the transistor 25. The PWM IC 21 is operational and outputs pulse signals to light up the backlight.

The switching circuit 24 is configured to control if the operation voltage is provided to the PWM IC 21. If the operation voltage is normal or larger than a predetermined voltage, such as the zener voltage, the operation voltage may be provided to the PWM IC 21 via the switching circuit 24. When the operation voltage is lower than the predetermined voltage, the switching circuit 24 disconnects the power source 22 and the PWM IC 21 such that the operation voltage cannot be provided to the PWM IC 21. Thus, a reliability of the backlight control circuit 20 is improved.

Figure 2:
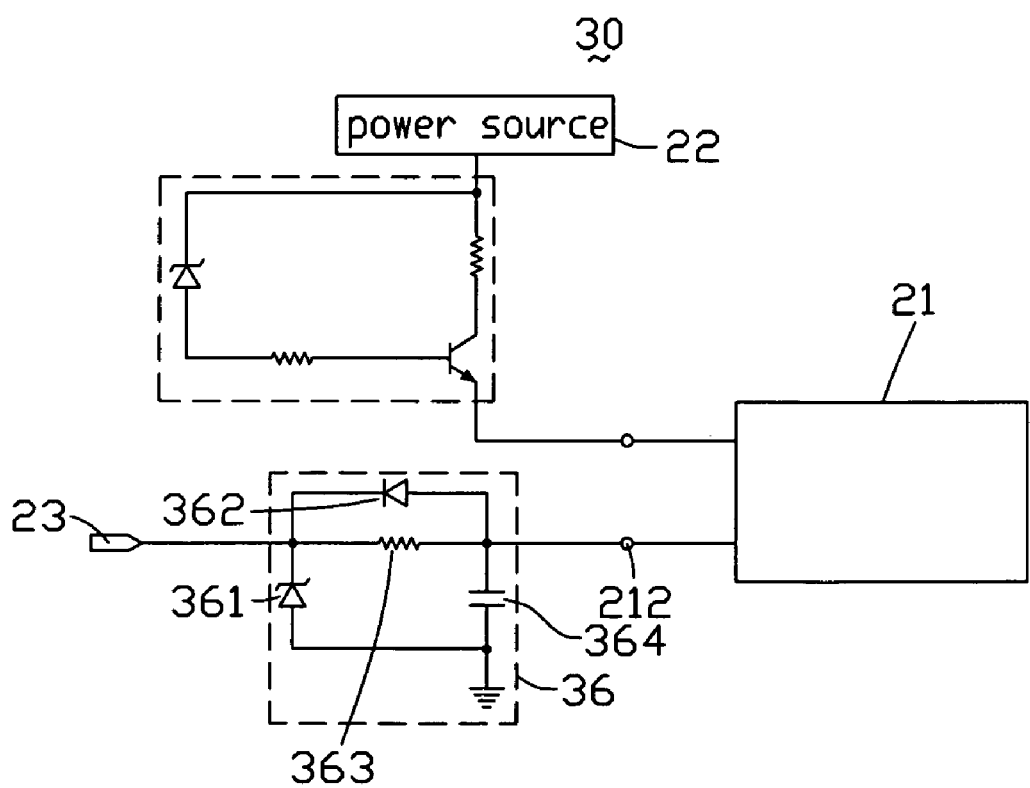
FIG. 2 is a diagram of a second embodiment of a backlight control circuit.

Referring to FIG. 2, a second embodiment of a backlight control circuit 30 is similar to the backlight control circuit 20 of FIG. 1, except that the backlight control circuit 30 further includes a limiting circuit 36 connected between a control terminal 23 and an enable terminal 212 of a PWM IC 21.

The limiting circuit 36 is configured to clip the control signal and protect the PWM IC 21. The limiting circuit 36 includes a second zener diode 361, a diode 362, a third resistor 363, and a first capacitor 364. The third resistor 363 is connected between the control terminal 23 and the enable terminal 212. The enable terminal 212 is connected to the control terminal 23 via the diode 362 in a forward conduction. The enable terminal 212 is connected to ground via the first capacitor 364. The control terminal 23 is connected to ground via the second zener diode 361 in reversed conduction. The first capacitor 364 is configured to eliminate an interference of the control signal and steady the control signal.

The control signal can be a low voltage, for example, zero volts, or a high voltage, for example, 3.3 volts. A zener voltage of the second zener diode 361, for example, would be approximately 3.3 volts.

If an LCD employing the backlight control circuit 30 is turned off, the scalar IC 21 generates the control signal having a low voltage, for example, zero volts, and sends the control signal to the enable terminal 212 via the control terminal 23. The PWM IC 21 is not operational and no pulse signal is outputted for lighting up the backlight.

If the LCD is turned on, the scalar IC generates the control signal having a high voltage and sends the high voltage to the control terminal 23.

If the control voltage is slightly less than the zener voltage of the second zener diode 361, the second zener diode 361 cannot be reversely conducted. The control voltage is provided to the enable terminal 212 via the third resistor 363. If the operation voltage of the power source 22 is provided to the PWM IC 21, the PWM IC 21 is operational and pulse signals are outputted to light up the backlight.

If the control voltage is equal to or larger than the zener voltage of the second zener diode 361, the second zener diode 361 is reversely conducted to maintain the control terminal 23 to the zener voltage. The clipped control voltage is provided to the enable terminal 212 via the third resistor 363. If the operation voltage of the power source 22 is provided to the PWM IC 21, the PWM IC 21 is operational and pulse signals are outputted to light up the backlight.

If the control signal is changed from a high voltage to a low voltage, the diode 362 is forward conducted. The first capacitor 364 can quickly discharge via the diode 362, thereby causing the enable terminal 212 to be a low voltage for stopping the PWM IC 21.

Figure 3:
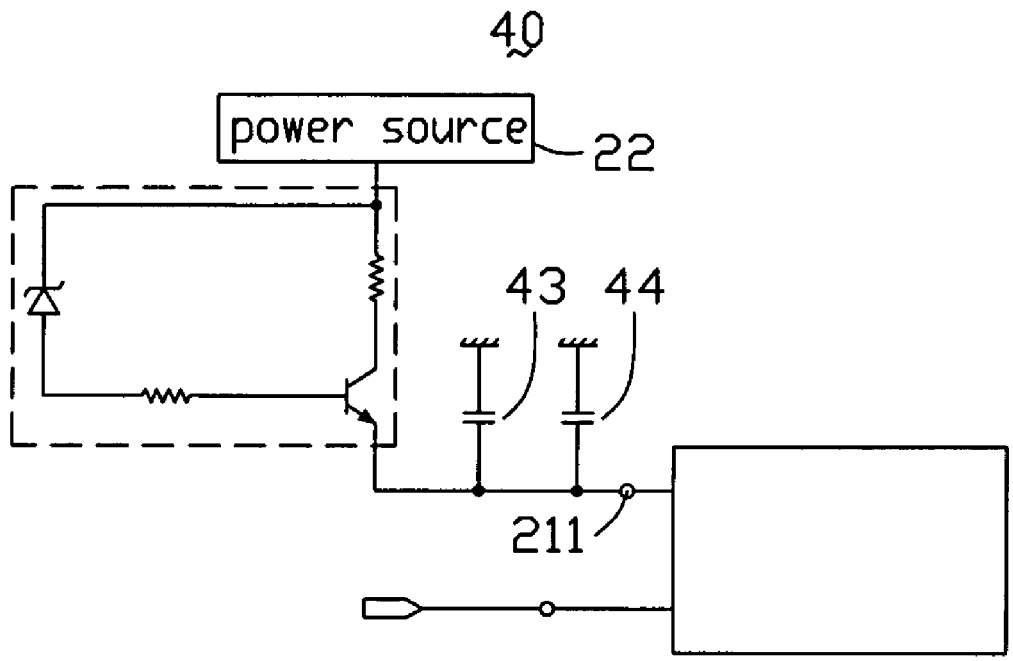
FIG. 3 is a diagram of circuits of a third embodiment of a backlight control circuit.
Figure 4:
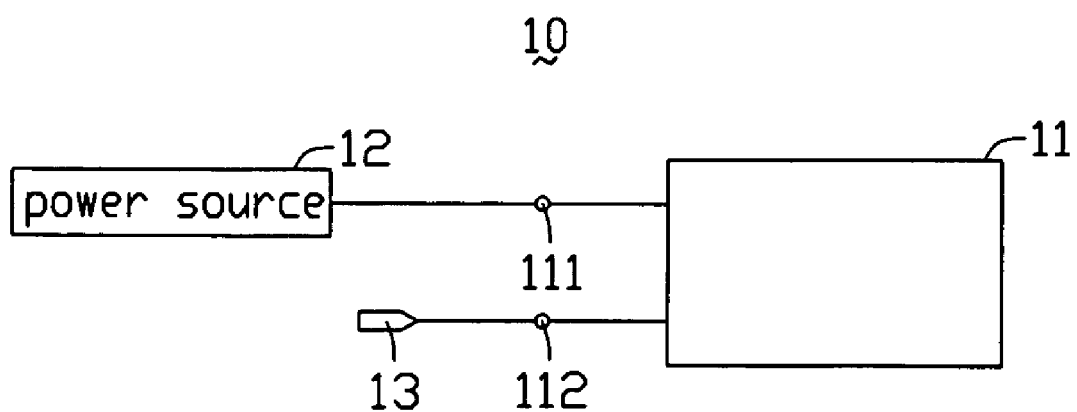
FIG. 4 is a diagram of a typical backlight control circuit in an LCD.

Referring to FIG. 3, a third embodiment of a backlight control circuit 40 is similar to the backlight control circuit 20 of FIG. 1, except that the backlight control circuit 40 further includes a second capacitor 43 and a third capacitor 44, both connected between a power input terminal 211 of an PWM IC 21 and ground in parallel as shown in FIG. 3. The second capacitor 43 and the third capacitor 44 are configured to eliminate the interference of the operation voltage provided by the power source 22.

It is to be understood, however, that even though numerous characteristics and advantages of the embodiments have been set out in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A backlight control circuit comprising:
a pulse width modulation integrated circuit (PWM IC) comprising a power input terminal;
a power source capable of outputting an operation voltage; and
a switching circuit connected between the power source and the PWM IC to control if the operation voltage is provided to the power input terminal, wherein the switching circuit comprises a first resistor, a first zener diode, and a transistor comprising a base electrode connected to the power source via a series connection of the first resistor and the first zener diode in forward conduction, a collector electrode connected to the power source, and an emitter electrode connected to the power input terminal.

2. The backlight control circuit of claim 1, wherein the operation voltage is provided to the power input terminal when the operation voltage is larger than or equal to a predetermined voltage.

3. The backlight control circuit of claim 2, wherein the switching circuit electrically disconnects the power source and the PWM IC when the operation voltage is less than the predetermined voltage.

4. The backlight control circuit of claim 2, wherein the predetermined voltage is substantially equal to 5 volts.

5. The backlight control circuit of claim 3, wherein a zener voltage of the first zener diode is larger than the predetermined voltage.

6. The backlight control circuit of claim 3, wherein the resistance of the first resistor is substantially equal to 1 kiloohm.

7. The backlight control circuit of claim 1, wherein the switching circuit further comprises a second resistor connected between the collector electrode and the power source.

8. The backlight control circuit of claim 7, wherein a resistance of the second resistor is substantially equal to 3.3 kiloohm.

9. The backlight control circuit of claim 7, further comprising a control terminal for receiving a control signal; the PWM IC further comprising an enable terminal connected to the control terminal.

10. The backlight control circuit of claim 9, wherein the control signal is one of a 3.3 volts high voltage and a zero volt voltage.

11. The backlight control circuit of claim 9, further comprising a limiting circuit connected between the enable terminal and the control terminal.

12. The backlight control circuit of claim 11, wherein the limiting circuit comprises a second zener diode and a third resistor; and the control terminal is connected to ground via the second zener diode in reversed conduction, and connected to the enable terminal of the PWM IC via the third resistor.

13. The backlight control circuit of claim 12, wherein the limiting circuit further comprises a diode and a first capacitor; and the enable terminal is connected to the control terminal via the diode in a forward conduction, and connected to ground via the first capacitor.

14. The backlight control circuit of claim 7, further comprising a second capacitor connected between the power input terminal and ground.

15. A backlight control circuit comprising:
   a control terminal;
   a pulse width modulation integrated circuit (PWM IC) comprising a power input terminal and an enable terminal;
   a power source capable of outputting an operation voltage;
   a switching circuit connected between the power source and the PWM IC to control if the operation voltage is provided to the power input terminal; and
   a limiting circuit connected between the enable terminal and the control terminal, the limiting circuit comprising a second zener diode, a third resistor, a diode and a first capacitor, wherein the control terminal is connected to ground via the second zener diode in reversed conduction, and connected to the enable terminal via the third resistor, and the enable terminal is connected to the control terminal via the diode in a forward conduction, and connected to ground via the first capacitor.

16. A backlight control circuit comprising:
   a control terminal;
   a pulse width modulation integrated circuit (PWM IC) comprising a power input terminal and an enable terminal configured for receiving a control signal having a high voltage level generated by an external circuit;
   a power source capable of outputting an operation voltage;
   a switching circuit connected between the power source and the PWM IC to control if the operation voltage is provided to the power input terminal; and
   a limiting circuit connected between the enable terminal and the control terminal, the limiting circuit configured to provide a zener voltage, wherein when the high voltage level of the control signal is larger than the zener voltage, the limiting circuit clips the control signal using the zener voltage and outputs the control signal having the zener voltage to the enable terminal, and when the high voltage level of the control signal is slightly less than the zener voltage, the enable terminal receives the control signal having the high voltage level;
   wherein the limiting circuit comprises a second zener diode and a third resistor; the control terminal is connected to ground via the second zener diode in reverse conduction, and connected to the enable terminal of the PWM IC via the third resistor, and the zener voltage is generated by the second zener diode;
   wherein the limiting circuit further comprises a diode and a first capacitor; and the enable terminal is connected to the control terminal via the diode in a forward conduction, and connected to ground via the first capacitor.

17. The backlight control circuit of claim 16, wherein when both of the power input terminal and the enable terminal are provided with the operation voltage and the control signal having any one of the high voltage level and the zener voltage, the PWM IC is operational; and
   when the control signal drops from the high voltage level to a low voltage level, the enable terminal controls the PWM IC to stop working.

18. The backlight control circuit of claim 16, wherein the switching circuit comprises a first resistor, a first zener diode, and a transistor comprising a base electrode connected to the power source via a series connection of the first resistor and the first zener diode in forward conduction, a collector electrode connected to the power source, and an emitter electrode connected to the power input terminal.

* * * * *